US009521199B2

(12) United States Patent
Madhavan et al.

(10) Patent No.: US 9,521,199 B2
(45) Date of Patent: Dec. 13, 2016

(54) RELIABLE TRANSFER OF DATA FROM AN IMAGE CAPTURING DEVICE TO A REMOTE DATA STORAGE

(71) Applicant: MOTOROLA MOBILITY LLC, Chicago, IL (US)

(72) Inventors: Gnanodharan Madhavan, Sunnyvale, CA (US); Priyanka D. Singh, Santa Clara, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 118 days.

(21) Appl. No.: 14/338,863

(22) Filed: Jul. 23, 2014

(65) Prior Publication Data
US 2016/0028818 A1 Jan. 28, 2016

(51) Int. Cl.
*G06F 15/167* (2006.01)
*H04L 29/08* (2006.01)
*H04N 1/00* (2006.01)
*H04W 8/20* (2009.01)

(52) U.S. Cl.
CPC ......... *H04L 67/1097* (2013.01); *H04L 67/141* (2013.01); *H04N 1/00244* (2013.01); *H04N 1/00307* (2013.01); *H04W 8/20* (2013.01); *H04N 2201/0084* (2013.01)

(58) Field of Classification Search
USPC .................................................. 709/213, 223
See application file for complete search history.

(56) References Cited

U.S. PATENT DOCUMENTS

| 8,627,033 | B2 | 1/2014 | Martinsen |
| 2004/0005915 | A1 | 1/2004 | Hunter |
| 2004/0053637 | A1 | 3/2004 | Iida |
| 2007/0286144 | A1 | 12/2007 | Miyake |
| 2009/0063624 | A1* | 3/2009 | Nordstrom ........ H04M 1/72525 709/203 |
| 2011/0947341 | | 2/2011 | Seung-Dong et al. |
| 2011/0264812 | A1 | 10/2011 | Bergman et al. |
| 2014/0140675 | A1* | 5/2014 | de Sa ............... H04N 21/21805 386/223 |

(Continued)

OTHER PUBLICATIONS

International Search Report and the Written Opinion received for PCT Application No. PCT/US2015/034892, Sep. 24, 2015, 14 pages.

*Primary Examiner* — Philip B Tran
(74) *Attorney, Agent, or Firm* — IP Spring

(57) ABSTRACT

A method for transferring data from a data capturing device (DCD) comprises: establishing a first communication link between a first user device and the DCD. The method also includes: the DCD capturing data intended to be communicated to the first user device; and notifying the first user device of an availability of captured data for transfer to the first user device. The method further includes: receiving a response from the first user device; and when the response indicates that the captured data should be sent directly to the first device, forwarding the captured data to the first user device. However, when the response includes remote storage connectivity data, which indicates that the captured data should be sent to the remote storage, the method includes establishing a data communication session with the remote storage using the remote storage connectivity data and transferring the captured data directly to the remote storage.

20 Claims, 6 Drawing Sheets

(56) References Cited

U.S. PATENT DOCUMENTS

2015/0092979 A1* 4/2015 Meredith ........... G06K 9/00577
382/103
2016/0014176 A1* 1/2016 Ariav ..................... H04L 65/60
709/219

* cited by examiner

RELIABLE TRANSFER OF DATA FROM AN IMAGE CAPTURING DEVICE TO A REMOTE DATA STORAGE

BACKGROUND

1. Technical Field

The present disclosure generally relates to image capturing user devices, and in particular to a method and system for enabling direct transfer of data from a user-wearable image capturing device to a remote storage.

2. Description of the Related Art

User wearable electronic devices, such as wearable cameras, are growing in popularity and usage. These devices are typically designed to communicate with other user devices in relative close proximity, such as with a smart phone, tablet or personal computer. The user wearable device ("UWD") is paired to the other user device via available mediums, which can include near filed communication (NFC), Bluetooth® or Wireless fidelity (WiFi), for example. With a user wearable device capable of capturing images, such as Google Glass™, the direct connection with the smart device enables the user wearable device to share its captured content with the smart device by direct transfer of content data to the smart device over the paired connection. The smart device can then share the received content data with other devices or store the received content data in a cloud or other storage.

BRIEF DESCRIPTION OF THE DRAWINGS

The description of the illustrative embodiments is to be read in conjunction with the accompanying drawings, wherein.

DETAILED DESCRIPTION

Figure 1:
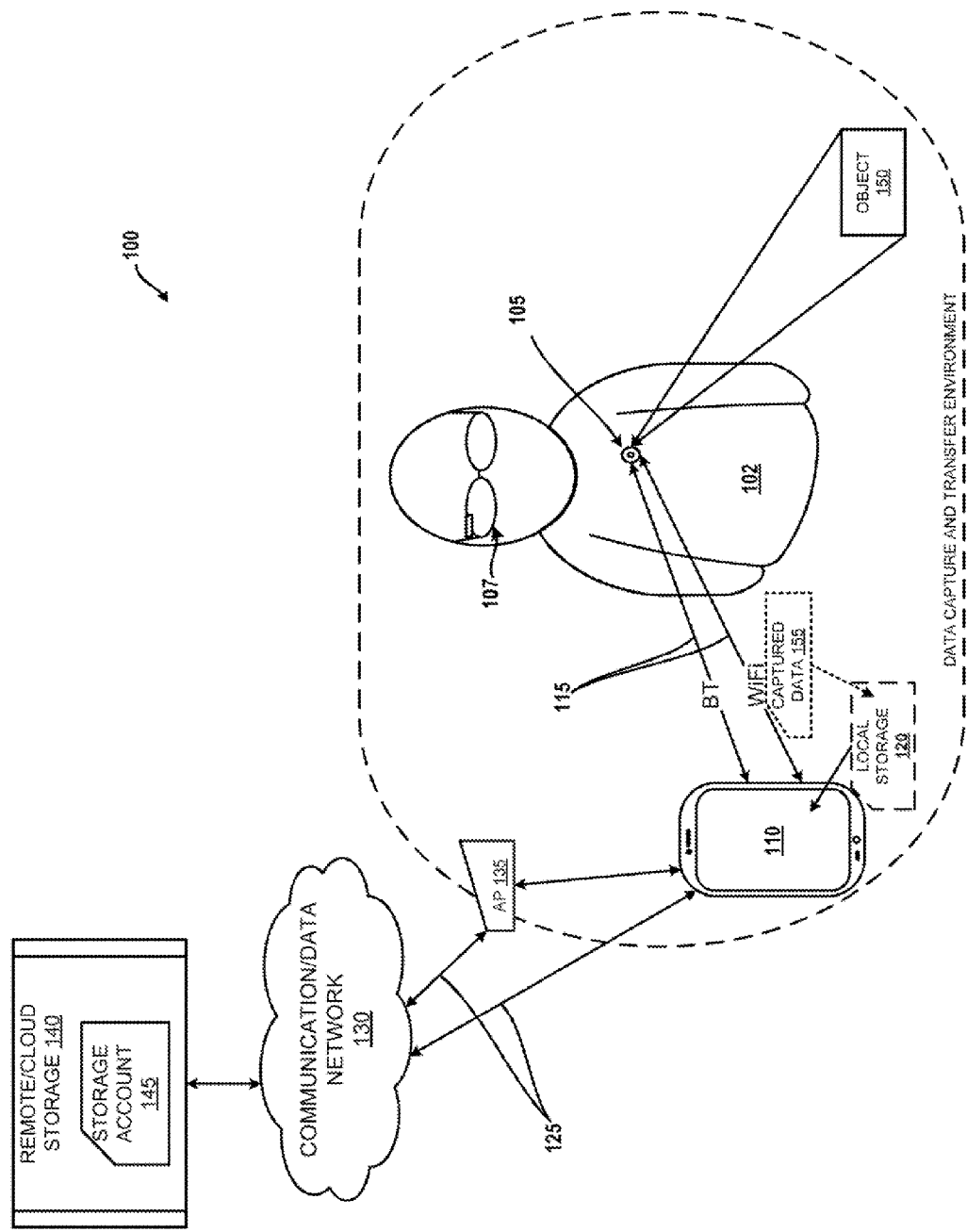
FIG. 1 illustrates an example communication and data exchange (CDE) environment in which a first user device, such as a mobile phone, having an association with a remote storage, can communicate with and receive captured image data from a separate wireless data capturing device (WDCD), according to one embodiment.

The illustrative embodiments of the present disclosure provide a wireless data capturing device (WDCD) and a method performed within a WDCD environment that enables creation of an ad-hoc session with a remote storage for direct transfer of content captured at the WDCD. According to one aspect, the WDCD is designed for sharing captured data with a communicatively-connected first user device, such as a smart phone. The WDCD includes: a data capturing component, such as a camera; at least one wireless communication component (e.g., a transceiver) supporting establishment of one or more wireless communication links with other devices; and a local storage. The WDCD further includes a controller coupled to the data capturing component, the at least one wireless component, and the local storage. The controller includes firmware that enables the WDCD to: establish establishing a first communication link between a first user device and the WDCD; capture data intended to be communicated to the first user device; notify the first user device of an availability of captured data for transfer to the first user device; receive a response from the first user device; and when the response indicates that the captured data should be sent to a remote storage: establish a data communication session with the remote storage; and transfer the captured data directly to the remote storage. When the response indicates that the captured data should be sent directly to the first device, the controller forwards the captured data to the first user device.

As another aspect of the disclosure, also provided is a wireless user device and a method performed by the wireless user device for triggering a reliable transfer of captured data from a connected WDCD. The method includes: establishing a first communication link between the first user device and the data capturing device; in response to receiving a notification that the data capturing device has data to transmit to the first user device, identifying whether at least one condition exists at the first user device that indicates when the first user device should not accept a transfer of the data; when none of the conditions exists, sending a response to the data capturing device to initiate the transfer of data from the data capturing device to the first user device over the communication link; and when at least one of the conditions exist at the first user device, sending a response to data capturing device that includes remote storage connectivity data, which enables the data capturing device to (i) connect to and establish a data communication path with a remote storage, and (ii) transfer the captured data directly to the remote storage.

In the following detailed description, exemplary embodiments in which various aspects of the disclosure may be practiced are described in sufficient detail to enable those skilled in the art to practice the invention. It is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

The description of the illustrative embodiments can be read in conjunction with the accompanying figures. Embodiments incorporating teachings of the present disclosure are shown and described with respect to the figures presented herein. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

FIG. 1 illustrates an example Data capture and exchange (DCE) environment 100 in which a WDCD 105 can communicate with and transfer captured image data 155 of an object 150 to a first user device 110, such as a mobile phone, during standard operation of the WDCD 105, according to one embodiment. For purposes of the disclosure, WDCD 105 is assumed to be a user wearable device. As shown, DCE environment 100 includes user 102 having WDCD 105 as a first wearable device. User 102 is also shown wearing a camera-equipped eyeglass 107 as a second example user wearable device or second WDCD 105. WDCD 105 is assumed to be a camera or image capture device within the disclosure, although WDCD 105 can be other types of data capture devices, such as an audio capture device or microphone, for example. WDCD 105 operates to capture specific types of data and transfer the captured data 155 to a first user device 110 to which the WDCD 105 is paired over a wireless medium 115. As illustrated, examples of wireless medium 115 that can be utilized for this pairing and data transfer include BT (Bluetooth®), WiFi Direct and WiFi (wireless fidelity). First user device 110 is represented as a mobile phone having local storage 120 in which first user device 110 can store captured data 155 that is received from WDCD 105.

DCE environment 100 also includes a communication network 130, which is assumed to be a data network over which first user device 110 can connect to a remote storage, which in some embodiments, can generally be referred to as "cloud storage" 140 or "cloud". Cloud storage 140 can include at least one storage facility that is accessible for storing data. In the illustrative embodiment, cloud storage 140 is shown to include at least one storage account 145. First user device 110 can access communication network 130 via an access point 135 (using WiFi, for example) or directly over a subscriber network (not specifically shown), such as a cellular subscriber network. Both network accesses 125 enable first user device 110 to access cloud storage 140 and share data with or download data from storage account 145. Communication network 130 can be representative of a plurality of different wireless communication networks that support the various different wireless communication technologies, such as LTE 4G, 3G, CDMA, and other wireless communication technologies, without limitation.

Figure 2:
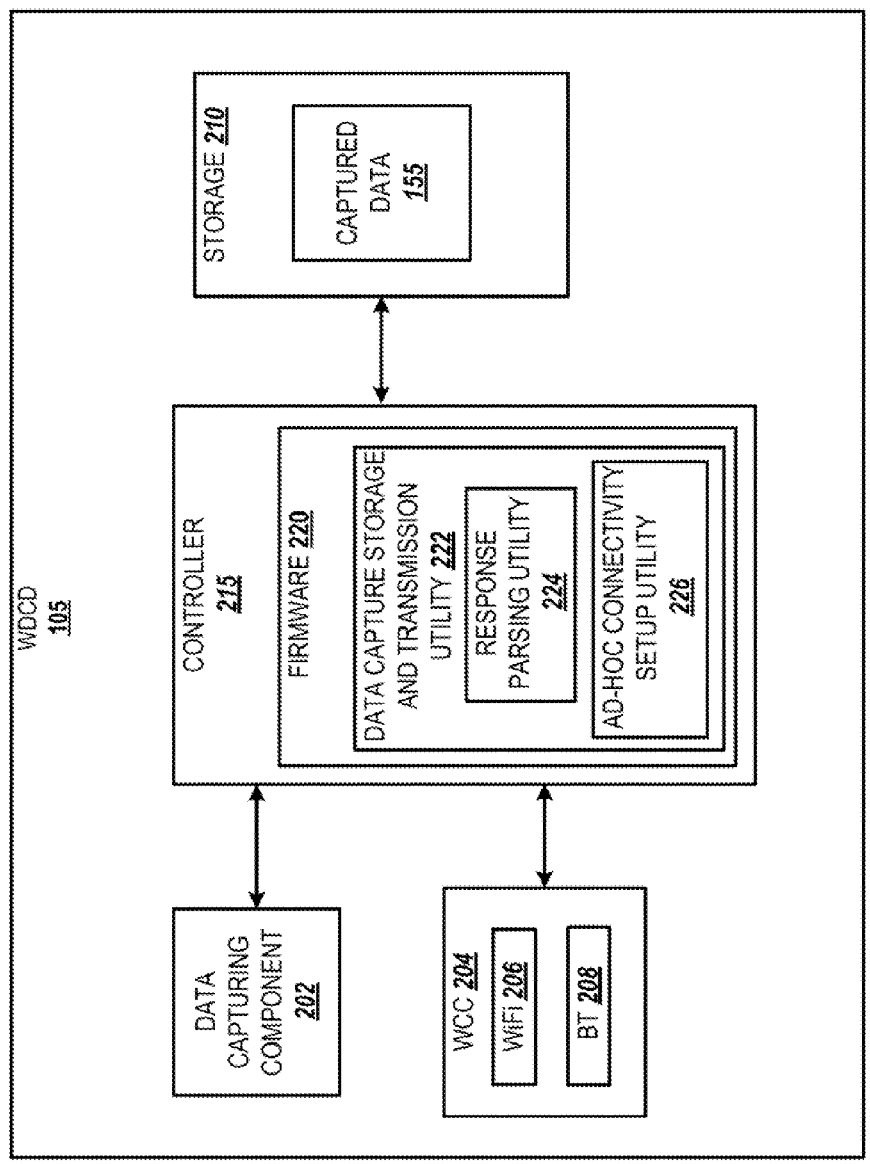
FIG. 2 provides a more detailed view of the functional makeup of an example WDCD, represented as an image capturing device, which supports configuration and/or establishment of a direct communication link for content exchange with the remote storage based on receipt of one or more triggers, in accordance with one embodiment.

FIG. 2 provides a block diagram representation of an example component makeup of WDCD 105. WDCD 105 includes a data capturing component 202, which may be a camera lens (for image capture) or microphone (for audio capture) or a combination of different components (for multimedia data capture). WDCD 105 also includes one or more WCC (wireless communication components) 204, of which Wifi Direct/WiFi transmitter 206 and Bluetooth® transmitter 208 are provided as examples. WDCD 105 further includes a local storage 210 within which captured data 155 can be temporarily stored. As further illustrated, WDCD 105 includes controller 215 which is programmed with firmware 220. Firmware 220 includes several functional modules or utilities, indicated as data capture storage and transmission utility 222, response parsing utility 224, and alternate connectivity setup utility 226. In one embodiment, alternate connectivity setup utility 226 can include pre-programmed connection information for creating a connection to a remote storage. Data capture storage and transmission utility 222 and response parsing utility 224 respectively facilitate the capturing and temporary storage of the captured data, notification to a connected first user device of the data availability for transfer, and evaluation of whether or when to transfer the data based on a response received from the first user device.

Figure 4:
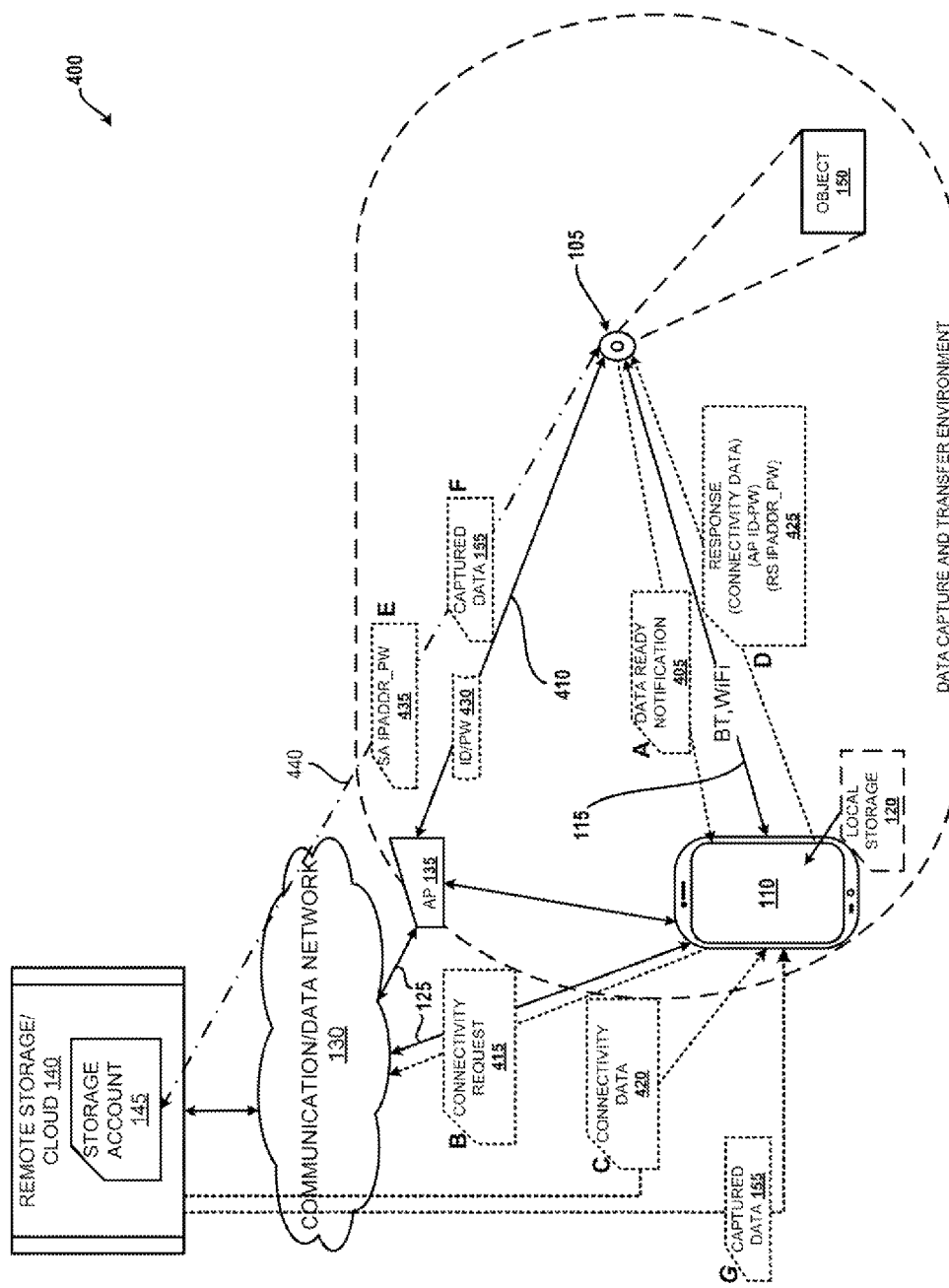
FIG. 4 illustrates a second example CDE environment in which the first user device has triggered the WDCD to configure an ad hoc communication link with the remote storage in order to forward captured content data directly to the remote storage, bypassing the first user device, in accordance with one embodiment.

According to one aspect of the disclosure, and referring to both FIG. 2 and FIG. 4, WDCD 105 is designed with the capability of sharing captured data with a communicatively-connected first user device, as a default device with which sharing of captured data occurs. As illustrated by FIG. 2, WDCD 105 includes: a data capturing component 202; at least one wireless communication component 204 supporting establishment of one or more wireless communication links with other devices; and a local storage 210. WDCD 105 also includes a controller 215 coupled to the data capturing component 202, the at least one wireless component 204, and the local storage 210, which includes firmware 220 that is executed by the controller 215 and enables WDCD 105 to: establish a first communication link 115 between a first user device (e.g., first user device 110) and WDCD 105; capture data (e.g., representing visual image of object 150) intended to be communicated to the first user device 110; notify (via data ready notification 405 (FIG. 4) the first user device 110 of an availability of captured data 155 for transfer to the first user device 110; and receive a response 425 (FIG. 4) from the first user device 110. The firmware 220 further enables the WDCD 105 to: forward the captured data 155 to the first user device 110, when the response 425 indicates that the captured data 155 should be sent directly to the first user device 110; and when the response 425 indicates that the captured data 155 should be sent to a remote storage (cloud storage 140), establish a data communication session 440 (FIG. 4) with the remote storage (140); and transfer the captured data 155 directly to the remote storage (140).

According to one aspect, the firmware 220 that enables the WDCD 105 to establish a data communication session with the remote storage includes firmware that enables the WDCD 105 to: retrieve remote storage connectivity data from the response 425; and access, at the remote storage, a storage account 145 identified by the WDCD 105 within the response 425 using the connectivity data. In one embodiment, the remote storage connectivity data comprises: (i) handshake data for connecting to an access point 135 located in communicative proximity to WDCD 105, where the access point 135 provides network connectivity to the remote storage 140 and (ii) storage account login information. In another embodiment, the remote storage connectivity data comprises at least one of Bluetooth® handshake information and wireless fidelity (WiFi) direct handshake information for an access point 135 located in communicative proximity to the data capturing device. In one or more embodiments, the remote storage connectivity data comprises a network identifier (ID) and a password.

According to one alternate embodiment, the remote storage connectivity data is programmed into WDCD 105, and the response 425 includes a trigger that causes WDCD 105 to establish the data communication session 440 using the programmed connectivity data. In one associated embodiment, in which the remote storage connectivity data is programmed into the data capturing device, the firmware causes the WDCD 105 to autonomously trigger establishment of the data communication session in response to not receiving any response from the first user device 110 within a preset time following local storage of captured data 155 and notification to the first user device 110.

As represented by FIG. 1, WDCD 105 includes at least one connectivity affordance that enables WDCD 105 to be worn by a user 102. Further, in at least one embodiment, WDCD 105 comprises a camera, and the captured data 155 is image data. In another embodiment, WDCD 105 comprises a microphone, and the captured data 155 is audio data. In yet anther embodiment, WDCD 105 comprises both a camera and a microphone, and the captured data 155 is multimedia data.

Figure 3:
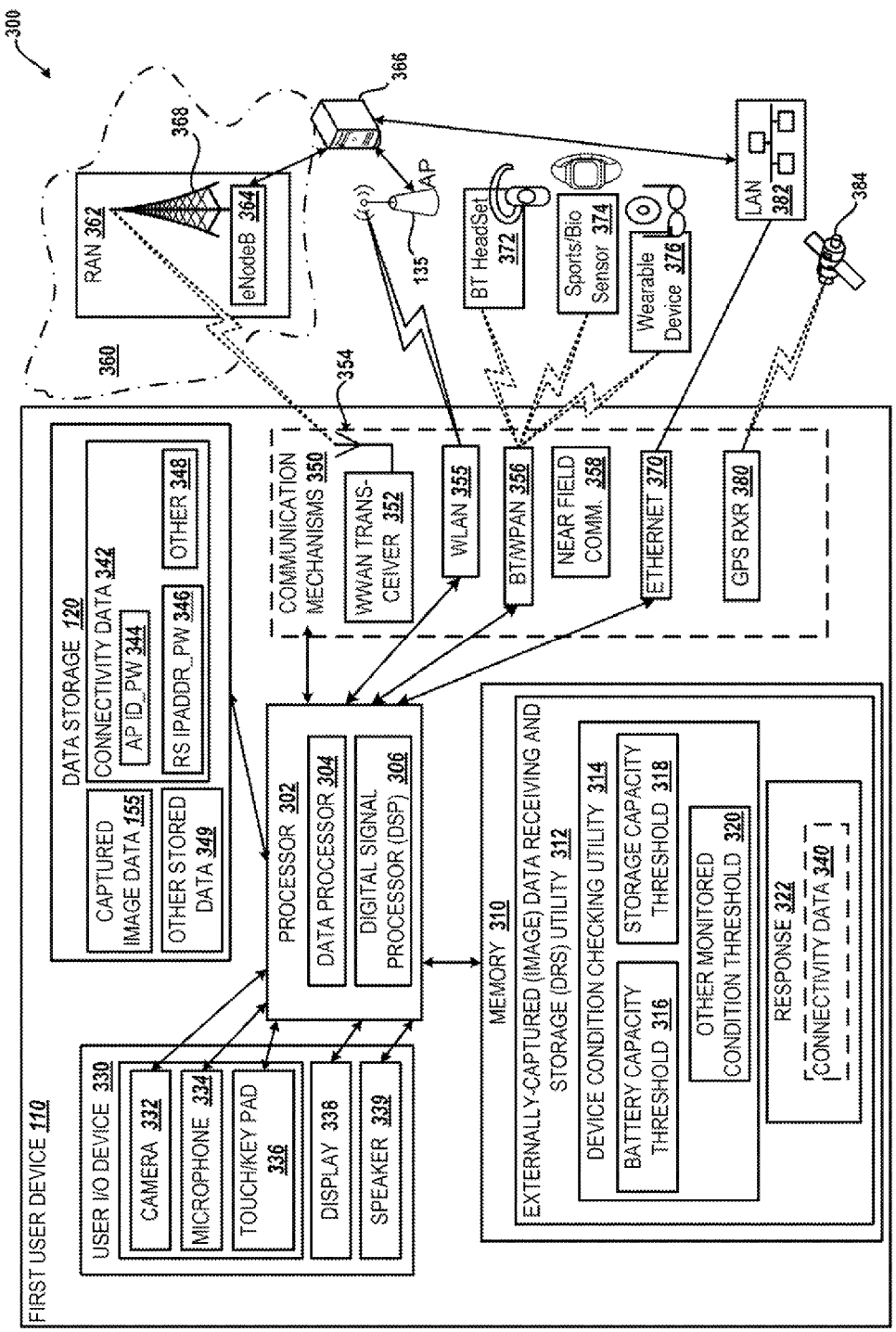
FIG. 3 provides a more detailed view of functional components of the first user device, represented by a mobile phone, which supports messaging and data exchange with the WDCD and with the remote storage, in accordance with one embodiment.

FIG. 3 provides a more detailed view of functional components of the first user device 110, represented as a wireless communication device, which supports communication and data exchange with the WDCD 105 and with the remote cloud storage 140, in accordance with one embodiment. While occasionally described and illustrated as a mobile phone, first user device 110 can be one of a host of different types of user communication devices, including but not limited to, a smart-phone, a desktop computer, a laptop, a net-book, an ultra-book, and/or a tablet computing device. The various devices provide and/or include the necessary hardware and software to support the various wireless or wired communication functions as part of DCE 100. For ease of reference throughout the description, first user device 110 will be referred to by the acronym FUD 110.

FUD 110 includes an integrated circuit (IC) processor 302, which connects via a plurality of bus interconnects (illustrated by the bi-directional arrows) to a plurality of functional components of FUD 110. Processor 302 can include one or more programmable microprocessors, such as a data processor 304 and a digital signal processor (DSP) 306, which, in some embodiments, may both be integrated into a single processing device. Processor 302 controls the communication, application data processing and signal processing, user interfacing, and other functions and/or operations of FUD 110. Connected to processor 302 is memory 310, which can include volatile memory and/or non-volatile memory. One or more executable applications or programmed utilities can be stored within memory 310 for execution by data processor 304 or in some signal processing scenarios by DSP 306. For example, memory 310 is illustrated as containing externally-captured data receiving and storage (DRS) utility 312. It is appreciated that memory 310 can also include other applications and/or services (not shown). In alternate embodiments, one or more of the utilities illustrated within memory can exist as firmware in other locations within FUD 110 and be utilized for controlling the operations of or execution by other controllers or specialized or dedicated processors within FUD 110.

DRS utility 312 includes a number of modules, including device condition checking (DCC) utility 314, response module 322, and connectivity data 340. DCC utility 314 includes threshold values for various monitored conditions that can occur with/within FUD 110, including but not limited to, battery capacity threshold 316, storage capacity threshold 318, and other monitored condition threshold 320. It is appreciated that other monitored condition threshold 320 represents a catch-all for the other thresholds that can be applied for monitored conditions, in alternate embodiments. The associated functionality and/or usage of each of the software modules will be described in greater detail within the descriptions which follow. In particular, the functionality associated with DRS utility 312 and DCC utility 314 are described in greater detail with the description of FIG. 5.

FUD 110 can include one or more input/output (I/O) devices 330 that operate as user interface devices. These I/O devices 330 can include one or more input devices, such as camera 332, microphone 334, touch screen and/or touch pad and/or keypad 336. The I/O devices 330 can also include one or more output devices, such as display 338 and speaker 339. The input devices can be utilized to access applications on the FUD 110, such as DCC utility 314 and enter and/or update threshold values programmed therein.

FUD 110 also includes data storage 120 that stores one or more data utilized during operation of FUD 110. Data storage 120 is also coupled to processor 302 and can be any type of available storage device that is integral, attachable or insertable and capable of storing one or more application software and data. It is further appreciated that in one or more alternate embodiments, data storage 120 can actually be remote storage and not an integral part of the FUD 110 itself. Among the stored data are captured image data 155, connectivity data 342, and other storage data 349. Connectivity data 342 includes access point (AP) ID and password (PW) data 344, remote storage data 346, and other data 348. Remote storage data 346 can include IP (Internet protocol) address and associated Password data required to log into the cloud service at remote/cloud storage 140 (FIG. 1). It is appreciated that the remote storage data 346 can include information about a specific user account 145 maintained at/on cloud storage 140 (FIG. 1) of FUD 110.

As illustrated, FUD 110 is capable of supporting multiple different forms of communication using several different technologies, according to a plurality of alternate embodiments. To support wireless communication, FUD 110 has at least one and preferably multiple of the different components that are illustrated within communication mechanism(s) 350. Communication mechanism(s) 350 includes wireless wide area network (WWAN) transceiver 352 with connected antenna 354, which enables FUD 110 to communicate with a radio access network (RAN) 362 of a cellular network 360, which can be synonymous with first communication network 130 for continuity with the FIG. 1 description. For simplicity, one connected antenna 354 of WWAN transceiver 352 is depicted. However, WWAN transceiver 352 may be associated with more than one antenna 354, each antenna having one or more selected bandwidths of operation to support different modes of communication or for simultaneous communication in different communication technologies. RAN 362 is generally represented as including a base station, depicted as an evolved base node ("eNodeB") 364 that transmits and receives communication signals over a base station antenna 368. The eNodeB 364 is illustrated communicatively connected to server 366, which is an example computing device that can provide cloud storage 140 (FIG. 1).

In addition to WWAN transceiver 352 and associated components, FUD 110 can include a wireless local area network (WLAN) module 355 to communicate with wireless networks accessible via wireless access point 135. As an example, the WLAN module 355 may support IEEE 802.11 standards with the access point 135 operating as a WiFi hotspot. Alternatively or in addition, wireless communication device 110 can also include components for wired communication, such as Ethernet module 370 for connecting to a local area network (LAN) 382. FUD 110 can also include one or more close range wireless communication technology modules, including a wireless personal access network (WPAN) or Bluetooth® transceiver 356 for communication with WPAN devices, depicted as a Bluetooth® headset 372, a sports/biometric/physiological sensor 374, and a wearable device 376 (such as multi-function watch, heads up display, camera, camera-equipped eye-glasses, etc.). WPAN transceiver 356 can support technologies such as Infrared Data Association (IrDA) standard, Wireless Universal Serial Bus (USB), Bluetooth®, Z-Wave, ZigBee, Body Area Network, and ANT+. Alternatively or in addition, close range wireless communication provided by FUD 110 can include a near field communication (NFC) transceiver 358, such as can be utilized for exchanging files with another user device, such as wearable device 376.

As further shown, FUD 110 can also include a global positioning system (GPS) receiver (RXR) 380, which can receive signals from GPS satellite 384 in order to provide location information. This location information can be utilized in one embodiment to determine whether the current location of the FUD 110 is a location of interest that would be trigger the functional features described herein.

Figure 5:
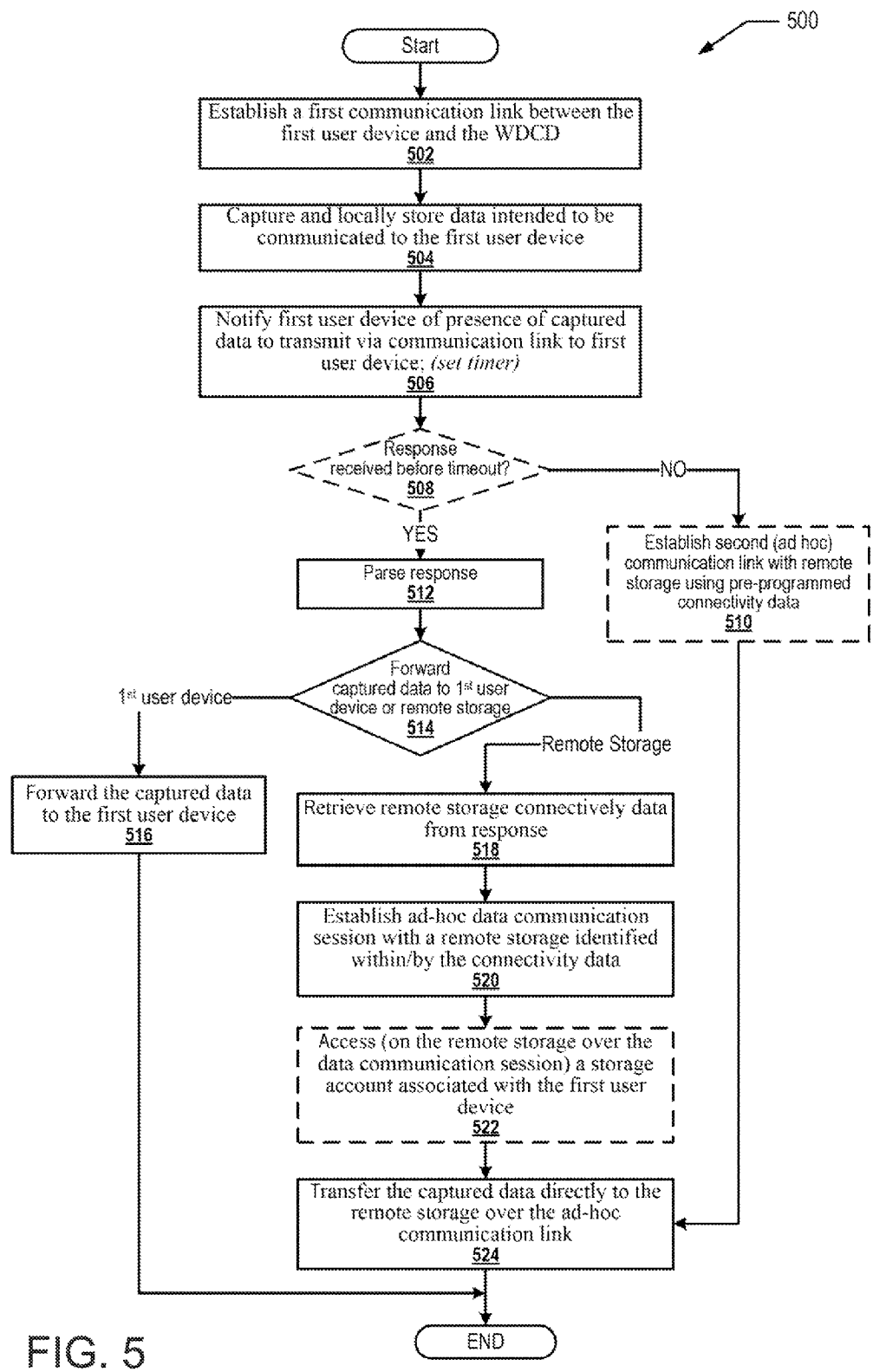
FIG. 5 is a flow chart of a method for configuring an ad hoc session for data transfer between the WDCD and the remote storage utilizing receive connectivity data from the first user device, in accordance with one embodiment.
Figure 6:
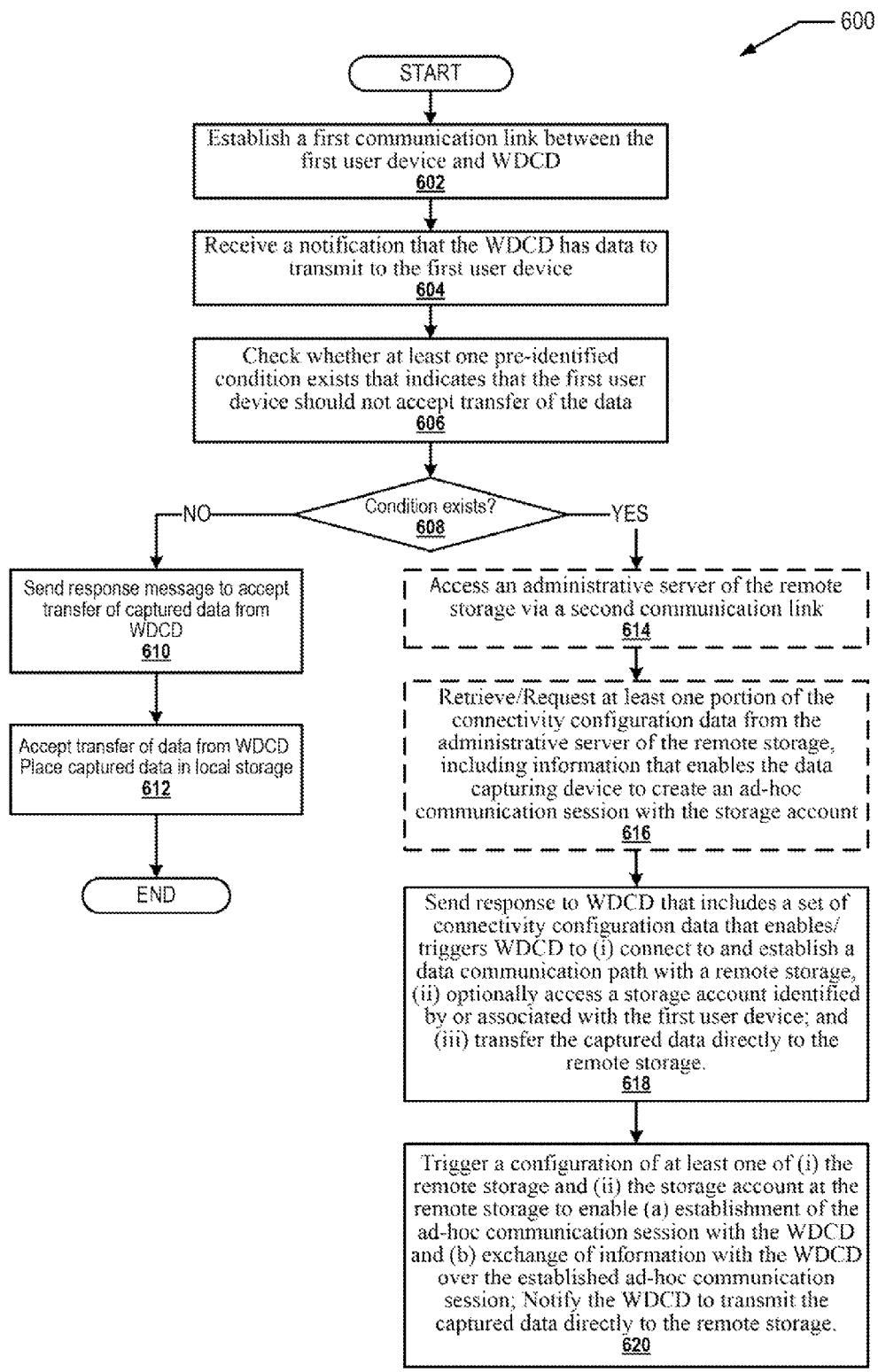
FIG. 6 is a flow chart of a method for remotely triggering the transfer of captured data from an external second device to the remote storage upon receipt of configuration information to enable establishment of an ad hoc session from the first user device, in accordance with one embodiment.

FIG. 4 illustrates data connectivity channels and routing of communication and data across expanded DCE (EDGE) 400, which is configured when first user device 110 is unable to accept transmission of captured data 155 from WDCD 105. Within the figure, the solid directional arrows indicate the communication channels, while the dashed and/or dotted directional arrows indicate the communications (i.e., messages and data) being exchanged or transmitted over those channels. The sequence in which the communication occurs over the respective channels is identified by the alphabetic labeling from A through G. Within FIG. 4, similar elements (e.g., initial communication channels 115, 125) are provided the same reference numeral as FIG. 1 and those elements which have been previously described in FIG. 1 may be omitted from or only summarily referenced within the description of FIG. 4. The description of FIG. 4 is further provided within the description of the flow charts, wherein FIG. 5 illustrates a first method for configuring an ad hoc session for data transfer between the data capturing device and the remote storage utilizing receive connectivity data from the first user device, in accordance with one embodiment, and FIG. 6 illustrates a second method for remotely triggering the transfer of captured data from an external second device to the remote storage upon receipt of configuration information to enable establishment of an ad hoc session from the first user device, in accordance with one embodiment. Within the flow chart of FIG. 5, the first method 500 is implemented by controller 215 executing firmware 220 within WDCD 105 (FIG. 2). The second method 600 illustrated by FIG. 6 is implemented by processor 302 executing DRS utility 312 utilizing one or more of the available communication mechanisms 350. Within both flow charts, optional features are presented within blocks having dashed lines. It is appreciated that these optional features can be implemented in some embodiments and omitted in others.

With reference to FIG. 5 and ongoing reference to FIG. 4, method 500 for transferring data from WDCD 105 includes: establishing a first communication link 115 between a first user device 110 and WDCD 105 (block 502); capturing and locally storing data intended to be communicated to the first user device 110 (block 504); and notifying the first user device of an availability of captured data for transfer to the first user device 110 via the first communication link 115 (block 506). Method 500 optionally includes setting a timer (in block 506) and determining, at optional decision block 508, whether a response is received from the first user device 110 before expiration of a time-out period. When no response is received before expiration of the time-out period, method 500 optionally includes automatically establishing and/or configuring a second communication link 440 to remote storage using pre-programmed information (optional block 510). Thus, in optional embodiments in which the remote storage connectivity data is programmed into the data capturing device, the method can include: when a response is not received from the first user device 110 within a preset time following notification by the data capturing device of local storage of captured data, WDCD 105 autonomously establishing the data communication session using the programmed remote storage connectivity data (510). Method 500 then includes transmitting the captured data to the remote storage via the second communication link (block 524).

Returning to the main flow of method 500, method 500 further includes receiving a response from the first user device and parsing the received response for specific information indicative of whether the first user device 110 will accept transfer of the captured data or is requesting the captured data be routed to a remote storage 140 (block 512). At decision block 514, method 500 includes determining whether the response indicates that the captured data should be forwarded to the first user device 110 or to a remote storage 140. As shown by block 516, when the response indicates that the captured data should be forwarded directly to the first device, method 500 includes forwarding the captured data to the first user device 110. Then, the method ends. However, when the response indicates that the captured data should be sent to a remote storage, method 500 includes retrieving remote storage connectivity data from the response (assuming such data is not already pre-stored within the WDCD 105) (block 518). Method 500 then includes establishing a data communication session with the remote storage identified within the connectivity data (block 520) and transferring the captured data directly to the remote storage (block 524). Additionally, in one or more alternate embodiments, remote storage connectivity data is programmed into the WDCD 105 and the response 425 operates as a trigger that causes the WDCD 105 to establish the data communication session 440 using the programmed connectivity data (block 510). Also, as shown by dashed block 522, method 500 can optionally include WDCD 105 accessing a specific user account associated with the first user device at the remote storage. Captured data 155 is then placed within the specific user account 145 for later access by or transfer to first user device 110.

According to illustrative embodiment of FIG. 4, in addition to the initial communication channels/links (115, 125) between devices, a third channel 410 is illustrated connecting WDCD 105 to communication network 130 via access point 135. For purposes of the disclosure, access point 135 is assumed to be within communication range of WDCD 105. Connection between WDCD 105 and access point 135 requires authentication, and WDCD 105 is configured to provide an authentication token 430 to AP 135 in response to (a) the response from the first user device 110 indicating the captured data should be forwarded to the remote storage 140 or (b) a failure of the first user device 110 to provide a response before a timeout. In at least one embodiment, the response 425 received from first user device 110 can include handshake and/or connectivity data, such as an access point ID-Password pairing and/or a remote storage IPAddress-Password pairing. These handshake data can then be provided by WDCD 105 as the authentication token/s 430/435 that allows WDCD 105 to access the remote storage 140. AP authentication token 430 is illustrated as being an ID/Password pairing, as one example of many authentication options that can be implemented. Remote storage authentication token 435 can include remote storage authentication information, which is illustrated as being transmitted via message transfer E, prior to transfer of captured data 155 via message transfer F.

Referring again to FIG. 5, in one embodiment, establishing the data communication session 440 with the remote storage 140 includes: retrieving remote storage connectivity data from the response 425; and accessing a storage account identified by or associated with the first user device 110 using the connectivity data within the response 425. As described above, the remote storage connectivity data can include: (i) handshake data for connecting to an access point located in communicative proximity to the data capturing device, where the access point provides network connectivity to the remote storage and (ii) storage account login information. Specifically, in one embodiment, the remote storage connectivity data comprises a network identifier (ID) and a password. In one embodiment, the remote storage connectivity data comprises wireless fidelity (WiFi) direct handshake information for an access point 135 located in communicative proximity to the WDCD 105. In another embodiment, the remote storage connectivity data includes Bluetooth® handshake information for an access point 135 located in communicative proximity to the WDCD 105.

According to one aspect of the disclosure, the timing of when first user device 110 provides a response that is not simply an acceptance of the transfer of the captured data (i.e., when the response indicates that the WDCD 105 should transfer the captured data to the remote storage 140), is based on one or more possible conditions that can occur or can be occurring at first user device 110. The specific condition/s can have occurred prior to or be occurring at the time of receipt of the data ready notification 405 (FIG. 4) via message transfer A. As previously mentioned, possible conditions can be or can include at least one of: a battery charge level of the first user device being below a threshold charge level; and a remaining storage capacity of the first user device 110 being at or below a threshold storage capacity level. FIG. 6 provides the processes occurring at the first user device 110 that can cause the first user device 110 to trigger the WDCD 105 to configure an ad hoc communication link with the remote storage 140 to forward captured data directly to the remote storage 140, according to one embodiment. Generally, FIG. 6 illustrates the method 600 for configuring data transfer to a remote destination from a wirelessly-connected data capturing device during a threshold condition occurring at a first user device. According to one aspect, the first user device 110 is a primary/master device which is programmed to establish a first communication channel 115 with and receive captured data from the WDCD 105, and the WDCD 105 is a secondary/slave device that is pre-configured to transmit captured data over the first communication channel 115 to the first user device 110. The term "threshold condition" generally means any condition that is identified within the utility as being one that would trigger the first user device 110 to issue a response that triggers the WDCD 105 to transmit captured data to the remote storage, rather than have the captured data be received for local storage at the first user device 110. The threshold condition can include a condition local to the device, such as a remaining low battery capacity, low storage capacity, and condition occurring outside of the device, such as low signal strength over the pairing channel or noisy connectivity which may affect the quality of the transfer over the first communication channel 115, or other conditions identified by a user or designer of first user device 110, such as GPS location of the first user device 110.

Method 600 includes: establishing a first communication link between the first user device 110 and the WDCD 105 (block 602); and subsequently receiving a notification that the WDCD 105 has data to transmit to the first user device 110 (block 604). In response to receiving the notification, method 600 includes checking and/or identifying whether at least one condition exists at the first user device 110 that indicates when the first user device should not accept a transfer of the data (block 604). In the illustrative embodiment, a determination is made at decision block 608 whether one of the conditions exist. In one or more embodiments, this singular decision block 608 represents a series of determinations of whether a first, second, or other condition exists at the first user device 110. Method 600 includes, sending a response to the WDCD 105 to initiate the transfer of data from the WDCD 105 to the first user device 110 over the communication link, when none of the conditions exist (block 610). Method 600 further includes accepting the transfer of data from WDCD 105 and placing the captured data in local storage (block 612).

However, when at least one of the conditions exist at the first user device 110, method 600 includes sending a response 425 to WDCD 105 that includes remote storage connectivity data, which enables the WDCD 105 to (i) connect to and establish a data communication path with a remote storage, and (ii) transfer the captured data directly to the remote storage 140 (block 618). This sending of the response can also include triggering a configuration of at least one of (i) the remote storage and (ii) the storage account at the remote storage to enable (a) establishment of the ad-hoc communication session with the WDCD and (b) exchange of information with the WDCD over the established ad-hoc communication session (block 620). The response essentially notifies the WDCD to transmit the captured data directly to the remote storage.

According to one embodiment, which is illustrated by communication exchanges B and C in FIG. 4, but presented as optional within method 600, method 600 can include, in response to detecting the existence of at least one condition: accessing an administrative server of a remote storage via a third communication link (block 614) and retrieving at least one portion of connectivity configuration data for accessing the remote storage (block 616). The retrieved connectivity configuration data includes information that enables the WDCD 105 to create an ad-hoc communication session with the remote storage 140; Method 600 then includes: triggering a configuration of the ad-hoc communication session by the data capturing device; and notifying the data capturing device to transmit the stored captured data 155 directly to the remote storage (block 620). In FIG. 4, the connectivity data 420 can be retrieved from remote storage 140 via a connectivity request 415 transmitted by first user device 110 to a server of remote storage 140 over the communication network 130. The server of the remote storage 140 then provides a response that includes the connectivity data 420, as indicated by message transmission C. First user device 110 then packages the connectivity data 420 into the response 425 to trigger the establishment of the ad-hoc session between WDCD 105 and remote storage 140. In another embodiment, first user device 110 had the connection data for both AP 135 and remote storage 140 within memory or storage, and first user device 110 simply packages that locally-stored connectivity data in the response 425. In one embodiment, the captured data 155 that is received at remote storage 140 from WDCD 105 via message transfer F can be later forwarded to first user device 110 via message transfer G. Thus, in one all-encompassing embodiment, the flow of messages between the various devices follows the sequence A-G, with the intermediate request for connectivity data and receipt of the remote server connectivity data (along message path B and C) occurring in real time.

In the flow charts of FIGS. 5 and 6 presented herein, certain processes of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method for transferring data from a data capturing device, the method comprising:

establishing a first communication link between a first user device and the data capturing device, wherein the first user device is within communicative proximity to the data capturing device and the data capturing device is a wearable device;

capturing, by the data capturing device, the data;

notifying the first user device of an availability of captured data for transfer to the first user device and a location of the data capturing device;

receiving a response from the first user device;

in response to the location of the data capturing device being a location of interest, the response including a first instruction to send the captured data directly to the first user device, forwarding the captured data to the first user device; and in response to the location of the data capturing device failing to be the location of interest, the response including a second instruction to send the captured data to a remote storage, establishing a data communication session with the remote storage and transferring the captured data directly to the remote storage.

2. The method of claim 1, wherein establishing a data communication session with a remote storage comprises:
retrieving remote storage connectivity data from the response; and
accessing a storage account identified by the first user device using the connectivity data.

3. The method of claim 2, wherein the remote storage connectivity data comprises (i) handshake data for connecting to an access point located in communicative proximity to the data capturing device, wherein the access point provides network connectivity to the remote storage and (ii) storage account login information.

4. The method of claim 2, wherein the remote storage connectivity data comprises wireless fidelity (WiFi) direct handshake information for an access point located in communicative proximity to the data capturing device.

5. The method of claim 2, wherein the remote storage connectivity data comprises Bluetooth® handshake information for an access point located in communicative proximity to the data capturing device.

6. The method of claim 2, wherein the remote storage connectivity data comprises a network identifier (ID) and a password.

7. The method of claim 1, wherein remote storage connectivity data is programmed into the data capturing device and the response operates as a trigger that causes the data capturing device to establish the data communication session using the programmed connectivity data.

8. The method of claim 1, wherein remote storage connectivity data is programmed into the data capturing device and, in response to not receiving a response from the first user device within a preset time following notification by the data capturing device of local storage of captured data, the method includes the data capture device autonomously triggering establishment of the data communication session.

9. A data capturing device designed for sharing captured data with a communicatively-connected first user device, the data capturing device comprising:
a data capturing component;
at least one wireless communication component supporting establishment of one or more wireless communication links with other devices;
a local storage;
a controller coupled to the data capturing component, the at least one wireless component, and the local storage and which includes firmware that enables the data capturing device to:
establish a first communication link between a first user device and the data capturing device, wherein the first user device is within communicative proximity to the data capturing device and the data capturing device is a wearable device;
capture data intended to be communicated to the first user device;
notify the first user device of an availability of captured data for transfer to the first user device and a location of the data capturing device;
receive a response from the first user device;
in response to the location of the data capturing device being a location of interest, the response including a first instruction to send the captured data directly to the first user device, forward the captured data to the first user device; and
in response to the location of the data capturing device failing to be the location of interest, the response including a second instruction to send the captured data to a remote storages, establish a data communication session with the remote storage, and transfer the captured data directly to the remote storage.

10. The data capturing device of claim 9, wherein the firmware that enables the device to establish a data communication session with the remote storage comprises firmware that enables the device to:
retrieve remote storage connectivity data from the response; and
access the remote storage identified within the response by with the first user device using the connectivity data.

11. The data capturing device of claim 10, wherein the remote storage connectivity data comprises (i) handshake data for connecting to an access point located in communicative proximity to the data capturing device, wherein the access point provides network connectivity to the remote storage and (ii) storage account login information.

12. The data capturing device of claim 10, wherein the remote storage connectivity data comprises at least one of Bluetooth® handshake information and wireless fidelity (WiFi) direct handshake information for an access point located in communicative proximity to the data capturing device.

13. The data capturing device of claim 10, wherein the remote storage connectivity data comprises a network identifier (ID) and a password.

14. The data capturing device of claim 10, further comprising at least one connectivity affordance that enables the data capturing device to be worn by a user.

15. The data capturing device of claim 10, wherein the data capture component comprises a camera and the captured data is image data.

16. The data capturing device of claim 9, wherein remote storage connectivity data is programmed into the data capturing device and the response includes a trigger that causes the data capturing device to establish the data communication session using the programmed connectivity data.

17. The data capturing device of claim 9, wherein remote storage connectivity data is programmed into the data capturing device and the firmware causes the data capturing device to autonomously trigger establishment of the data communication session in response to not receiving any response from the first user device within a preset time following local storage of captured data and notification to the first user device.

18. A method for configuring a data transfer to a remote destination from a wirelessly-connected data capturing device, the method comprising:
establishing a first communication link between a first user device and the data capturing device, wherein the first user device is within communicative proximity to the data capturing device and the data capturing device is a wearable device;
in response to receiving a notification that the data capturing device has data to transmit to the first user device, the first user device identifying whether at least one condition exists at the first user device that indicates when the first user device should not accept a transfer of the data, wherein the at least one condition includes a battery charge level of the first user device that is below a threshold charge level and a remaining storage capacity of the first user device that is at or below a threshold storage capacity level;

in response to the at least one condition failing to exist, sending a response to the data capturing device to initiate the transfer of data from the data capturing device to the first user device over the communication link; and in response to at least one of the conditions existing, sending a response to the data capturing device that includes remote storage connectivity data, which enables the data capturing device to (i) connect to and establish a data communication path with a remote storage, and (ii) transfer the captured data directly to the remote storage.

19. The method of claim 18, further comprising:

in response to detecting the existence of the at least one condition:
- retrieving at least one portion of connectivity configuration data for accessing the remote storage, wherein the retrieved connectivity configuration data includes information that enables the data capturing device to create an ad-hoc communication session with the remote storage;
- triggering a configuration of the ad-hoc communication session by the data capturing device; and
- notifying the data capturing device to transmit the stored captured data directly to the remote storage.

20. The method of claim 18, wherein the at least one condition further comprises low signal strength.

* * * * *